Feb. 14, 1961 F. J. MUELLER 2,972,061

STABILIZED BLOCKING OSCILLATOR

Filed July 24, 1957

INVENTOR
FRANK J. MUELLER
BY George Sipkin
B. L. Zangwill
ATTORNEYS 2,972,061

STABILIZED BLOCKING OSCILLATOR

Frank J. Mueller, Syosset, N.Y., assignor, by mesne assignments, to the United States of America as represented by the Secretary of the Navy Filed July 24, 1957, Ser. No. 673,986

2 Claims. (Cl. 307—88.5)

This invention relates to stabilized blocking oscillators and more particularly to a blocking oscillator using a transistor where the characteristics of the circuit are controlled so that a pulse may be generated which is of a predetermined length and which will not vary from transistor to transistor.

Blocking oscillators of the type contemplated by this invention generally comprise a transistor which is energized by suitable voltages and a feedback transformer which feeds back an appreciable amount of the power developed in the collector circuit to the input circuit which is generally the base of the transistor. A large amount of power is fed back from the collector to the base circuit in order to get the maximum power output from the oscillator circuit. Due to the nature of the feedback transformer which requires a gradually increasing current in the primary winding of the feedback transformer to generate a relatively constant voltage in the secondary or base circuit, the pulse may be terminated by the lack of a sufficiently high voltage to keep the transistor turned on or conducting. In transistor blocking oscillators the power which is fed back from the collector to the base is enough to drive the transistor into the saturation region. Due to the fact that the saturation characteristics of a transistor limit the amount of power which may be developed in the collector circuit and thereby limit the amount of power which is fed back to the base circuit, the saturation characteristics of a transistor in many applications limit the pulse length of a blocking oscillator and any change in these characteristics, such as from transistor to transistor or within the same transistor due to changes in the ambient temperature, causes a change in the pulse length of the transistor blocking oscillator.

In accordance with the present invention, an additional circuit is used in conjunction with the power supply of the transistor to vary the amount of power supplied to the feedback transformer and thereby determine the pulse length independently of the saturation characteristics. This invention uses a constant voltage source as a power supply for the collector of the transistor through the feedback transformer. This constant voltage supply is current sensitive, however, and when the current through the collector winding is increased to a specified amount, a switching element in the constant voltage source operates and changes the constant voltage source to a high impedance voltage source, thereby sharply limiting the power supplied to the feedback transformer and turning the pulse off.

Accordingly, a primary object of this invention is to provide a switching circuit which will provide, with a blocking oscillator circuit, a constant pulse output which is independent of the saturation characteristics of a transistor.

The exact nature of this invention as well as other objects and advantages thereof will be readily apparent from a consideration of the following specification relating to the annexed drawing in which.

Figures 1, 2:
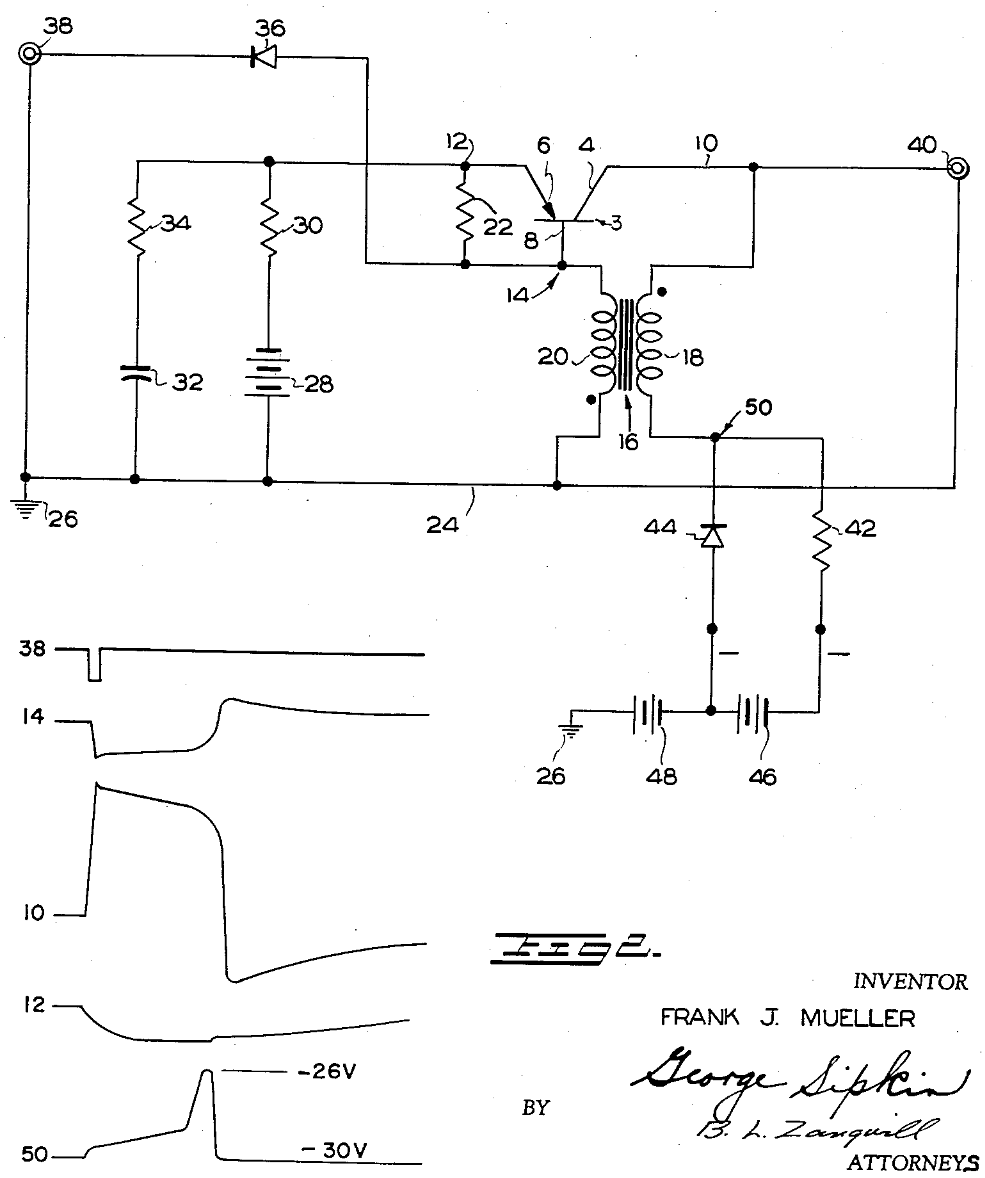
Fig. 1 is a schematic diagram of the stabilized blocking oscillator.
Fig. 2 is a graphical representation of typical wave forms which the circuit in Fig. 1 exhibits.

Referring to Fig. 1, the stabilized blocking oscillator comprises a transistor 3 having a collector 4, an emitter 6, and a base 8. This circuit is arranged in a grounded emitter connection for the transistor with the collector 4 connected to the output line 10, and the emitter 6 being connected to a grounded biasing circuit by means of connection 12. The base 8 is connected to the input line 14 which will be more particularly described further on.

The blocking oscillator transformer 16 is shown having a primary winding 18 connected by one end to the collector 4 of the transistor 3. The secondary winding 20 is connected to the base 8 by means of connection 14 on one end and to the ground line 24 and thereby to ground 26 at the other end of the winding. A secondary winding discharge and transistor protective resistor 22 is connected between the base connection 14 and the emitter connection 12. This resistor acts to discharge the oscillating currents in the secondary winding 20 of the transformer 16 and also limits the rather large voltage surges which occur in a blocking oscillator circuit.

The emitter 6 is biased by a biasing circuit which, in this case, comprises a biasing battery 28 with an emitter discharge resistor 30 connected to the emitter connection 12. The proper biasing potential is applied to the transistor by means of the circuit loop composed of batteries 28, resistors 30 and 22 and winding 20. A parallel biasing circuit comprising an emitter bypass capacitor 32 and an emitter bypass resistor 34 are also connected to the emitter connection 12. The pulse length may be varied if desired by varying capacitor 32 and resistor 34.

In order to eliminate the loading on the input circuit and decrease the interaction between the input circuit and the blocking oscillator, a triggering diode 36 is connected to the base connection 14 and to the input terminal 38. The transistor is turned on by a negative signal applied to the input terminal 38 as shown by the wave form marked 38 in Fig. 2. Further positive variations in the input signal will not affect the pulse length or amplitude of the blocking oscillator due to the effect of the diode 36 which essentially opens the circuit between the blocking oscillator and the input terminal 38.

In order to generate a specified pulse length which is independent of the saturation characteristics of the transistor, a new circuit is shown connected to the secondary winding 18 of the transformer 16 at connection 50. This circuit comprises a resistor 42 and a diode 44 which is shown having its cathode connected to terminal 50 and its anode connected to a source of voltage 48. A second source of voltage 46 is shown connected to one end of the resistor 42 and the anode of the diode 44.

The operation of the circuit is as follows: A triggering signal which arrives at the input 38 and is applied through the diode 36 to the base of the transistor causes the transistor to be turned on and power developed in the collector circuit. The power developed in the collector circuit is passed through the collector winding 18 and a portion of it is fed back to the secondary winding 20 and thence to the base of the transistor. Regeneration in the circuit is thus provided and a pulse output appears on collector line 10 and output terminal 40. Due to the nature of the feedback transformer 16, the current in the collector winding 18 must continually increase to provide power to keep the base of the transistor sufficiently energized. This current flows through a resistor 42 and thence to the battery 46. Due to the connection of the constant voltage circuit a current, hereinafter called the quiescent current, flows from the battery 46 through the diode 44 and through resistor 42. When the increase in current from the blocking oscillator transistor flows through resistor 42, it tends to increase the voltage at point 50. This increase in current causes the quiescent current through the diode 44 to decrease until the quiescent current is reduced to zero. At the time when the quiescent current is reduced to zero, the diode 44 becomes nonconductive or opens up and allows the voltage at point 50 to rise rapidly. This rapid rise of voltage at point 50 sharply decreases the voltage available across the primary winding 18 and thereby quickly reduces the power fed to the base 8 of the transistor. This action quickly turns off the transistor and terminates the pulse generated by the blocking oscillator.

This operation is shown graphically in Fig. 2 by the numbers of the wave forms in Fig. 2 referring to the points in the schematic diagram of Fig. 1. Thus at point 38 an input voltage triggers the transistor, and an output pulse is generated on line 10 which is connected to the collector 4 of the transistor. The action of the constant voltage source on the blocking oscillator is shown in wave form 50 by the gradually increasing current through the resistor 42 which causes the voltage at point 50 to rise very slowly until the quiescent current in the diode 44 has been reduced to zero. At this time the voltage at point 50 rises sharply until the regenerative action is terminated which thereby ends the pulse.

It will be seen from this description that if the current gain, alpha, of the transistor is high enough so that proper regenerative action may be obtained, the pulse length is determined primarily by the inductance of winding 18, the quiescent current through the diode 44, and the voltage at point 50. Thus, transistors which vary in their saturation characteristics due to normal manufacturing tolerances may be used in the circuit without affecting the pulse length.

Another advantage of this circuit is that a change in saturation characteristics due to the change in temperature of the transistor will not affect the pulse length and that therefore a pulse output is obtained which is almost independent of the characteristics of the transistor.

The following values for the circuit shown in Fig. 1 are given by way of example;

| | |
|---|---|
| Diode **36** | Type 1N34A. |
| Diode **44** | Type 1N34A. |
| Transformer **16** | Technitrol type BVA, winding 18 inductance 15 millihenries. |
| Turns ratio **18/20** | 4/1. |
| Transistor **3** | Type W.E. A1698 ("N" type point contact). |
| Resistor **22** | 15K ohms. |
| Resistor **30** | 390K ohms. |
| Resistor **34** | 510 ohms. |
| Resistor **42** | 4K ohms. |
| Batteries **28** | 45 volts. |
| Batteries **46** | 37½ volts. |
| Batteries **48** | 30 volts. |
| Capacitor **32** | .005 mf. |
| Pulse length | 3.8 microseconds. |

Other modifications apparent to anyone skilled in the art, such as using a grounded base connection or other variations of the connection in the circuit will not be described.

It should be understood, of course, that the foregoing disclosure relates only to a preferred embodiment of the invention and it is intended to cover all changes and modification of the example of the invention herein chosen for the purposes of disclosure, which do not constitute departures from the spirit and scope of the invention.

What is claimed is:

1. A stabilized transistor blocking oscillator for generating a pulse comprising a transistor having an emitter, a base, and a collector; a biasing circuit connected to said emitter comprising a first circuit comprising a biasing battery and a first resistor in series and a second circuit connected in parallel to said first circuit comprising a capacitor and a second resistor in series, said parallel circuits connected between said emitter and ground; a feedback transformer having a primary winding with one end connected to said collector and a secondary winding having one end connected to ground and the other end connected to said base; a secondary winding discharge and transistor protective resistor connected between said base and said emitter; and a pulse length determining constant voltage source connected to the other end of said primary winding comprising a diode having a cathode connected to said other end of said primary winding and an anode adapted to be connected to a first source of voltage and a resistor having one end connected to said other end of said primary winding and the other end adapted to be connected to a second voltage source whereby the constant voltage source has a low impedance to current flow during a pulse and has a high impedance to current flow at the end of said pulse.

2. A stabilized transistor blocking oscillator for generating a pulse comprising; a transistor having an emitter, a base, and a collector; a feedback transformer having a primary winding with one end connected to said collector and a secondary winding having one end connected to ground and the other end connected to said base; a secondary winding discharge and transistor protective resistor connected between said base and said emitter; and a pulse length determining constant voltage source connected to the other end of said primary winding comprising a diode having a cathode connected to said other end of said primary winding and an anode adapted to be connected to a first source of voltage, and a resistor connected to said other end of said primary winding and adapted to be connected to a second voltage source whereby the constant voltage source has a low impedance to current flow at the beginning of a pulse and has a high impedance to current flow at the end of said pulse.

References Cited in the file of this patent

UNITED STATES PATENTS

| | | |
|---|---|---|
| 2,143,366 | Andrieu | Jan. 10, 1939 |
| 2,438,845 | Dodds et al. | Mar. 30, 1948 |
| 2,745,012 | Felker | May 8, 1956 |
| 2,758,206 | Hamilton | Aug. 7, 1956 |
| 2,802,118 | Simkins | Aug. 6, 1957 |
| 2,850,630 | Prugh | Sept. 2, 1958 |
| 2,850,648 | Elliott | Sept. 2, 1958 |
| 2,906,893 | Mattson | Sept. 29, 1959 |